United States Patent
Ma et al.

(10) Patent No.: US 9,628,156 B1
(45) Date of Patent: Apr. 18, 2017

(54) RADIO FREQUENCY DISTRIBUTION NETWORK FOR A SPLIT BEAM USER SPECIFIC TILT ANTENNA

(71) Applicant: Futurewei Technologies, Inc., Plano, TX (US)

(72) Inventors: Zhengxiang Ma, Summit, NJ (US); Leonard Piazzi, Denville, NJ (US); Huairen Yi, Somerset, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 14/987,513

(22) Filed: Jan. 4, 2016

(51) Int. Cl.
| | | |
|---|---|---|
| H04B 7/02 | (2006.01) | |
| H04B 7/0452 | (2017.01) | |
| H04B 7/0408 | (2017.01) | |
| H01Q 21/00 | (2006.01) | |
| H01Q 21/29 | (2006.01) | |
| H01Q 25/00 | (2006.01) | |

(52) U.S. Cl.
CPC ....... *H04B 7/0452* (2013.01); *H01Q 21/0006* (2013.01); *H01Q 21/293* (2013.01); *H01Q 25/00* (2013.01); *H04B 7/0408* (2013.01)

(58) Field of Classification Search
None
See application file for complete search history.

(56) References Cited

U.S. PATENT DOCUMENTS

| | | | | |
|---|---|---|---|---|
| 2006/0040615 A1* | 2/2006 | Mohamadi | ............ | H04B 7/0613 455/25 |
| 2012/0098595 A1* | 4/2012 | Stockert | ................ | H03F 1/0227 330/126 |
| 2012/0315043 A1* | 12/2012 | Nakagawa | ......... | H04B 10/5053 398/65 |
| 2016/0192207 A1* | 6/2016 | Foo | ........................ | H04W 16/28 455/562.1 |

* cited by examiner

*Primary Examiner* — Shuwang Liu
*Assistant Examiner* — Gina McKie
(74) *Attorney, Agent, or Firm* — Futurewei Technologies, Inc.

(57) ABSTRACT

A RF distribution network for split beam antennas is disclosed. The split beam antennas may include four-column cross-polarized user specific tilt antennas implemented in a 4T4R or 4T8R system. A RF distribution network may provide transmit signals from transmitters to antennas while also providing receive signals from the antennas. A RF distribution network may include 180° 6.9 dB combiners coupled to the antennas and also coupled 90° hybrids. A 180° 6.9 dB combiner may include a transmission network with transmission lines in a 4T4R system. Alternatively, a 180° 6.9 dB combiner may include a transmission network with transmit and receive filters in a 4T8R system. The transmission network couples the transmit filter and two filters by at least three λ/4 transmission lines. A transmission network provides isolation between two receive signal paths and, at the same time, provides power splitting of transmitter power to two duplexed transmit signal paths.

30 Claims, 9 Drawing Sheets

| Weighting Factors for Two Split Beams are (with 6.9dB tapering): | | | |
|---|---|---|---|
| -0.3195+0.3195i | 0.7071+0.7071i | 0.7071-0.7071i | -0.3195-0.3195i |
| -0.3195-0.3195i | 0.7071-0.7071i | 0.7071+0.7071i | -0.3195+0.3195i |

Table 300

| Applying UST coding of A-j*B and B-j*A: | | | |
|---|---|---|---|
| -0.6390+0.6390i | 0.0000-0.0000i | 1.4142-1.4142i | 0.0000-0.0000i |
| 0.0000-0.0000i | 1.4142-1.4142i | 0.0000-0.0000i | -0.6390+0.6390i |

Table 400

| Port | A/H | A/L | B/H | B/L |
|---|---|---|---|---|
| 0 | 1 | -j | -j | -1 |
| 1 | -j | 1 | -1 | -j |
| 2 | 1 | -j | j | 1 |
| 3 | -j | 1 | 1 | j |

Table 700

Fig. 7

| 2T Precoding Codebook (1 Layer) | | | Resulted Beam Description for 90 Degree Hybrid Port 1=A+ jB and Port 2 = B + jA |
|---|---|---|---|
| 2 | [1,-j] | 2A | P +45° T8° beam |
| 3 | [1, j] | 2jB | P -45° T14° beam |
| 0 | [1, 1] | (1+j)(A+B) | Vertically polarized with downward tilt of 11° |
| 1 | [1,-1] | (1-j)(A-B) | Horizontally polarized with downward tilt of 11° |

Table 800

Fig. 8

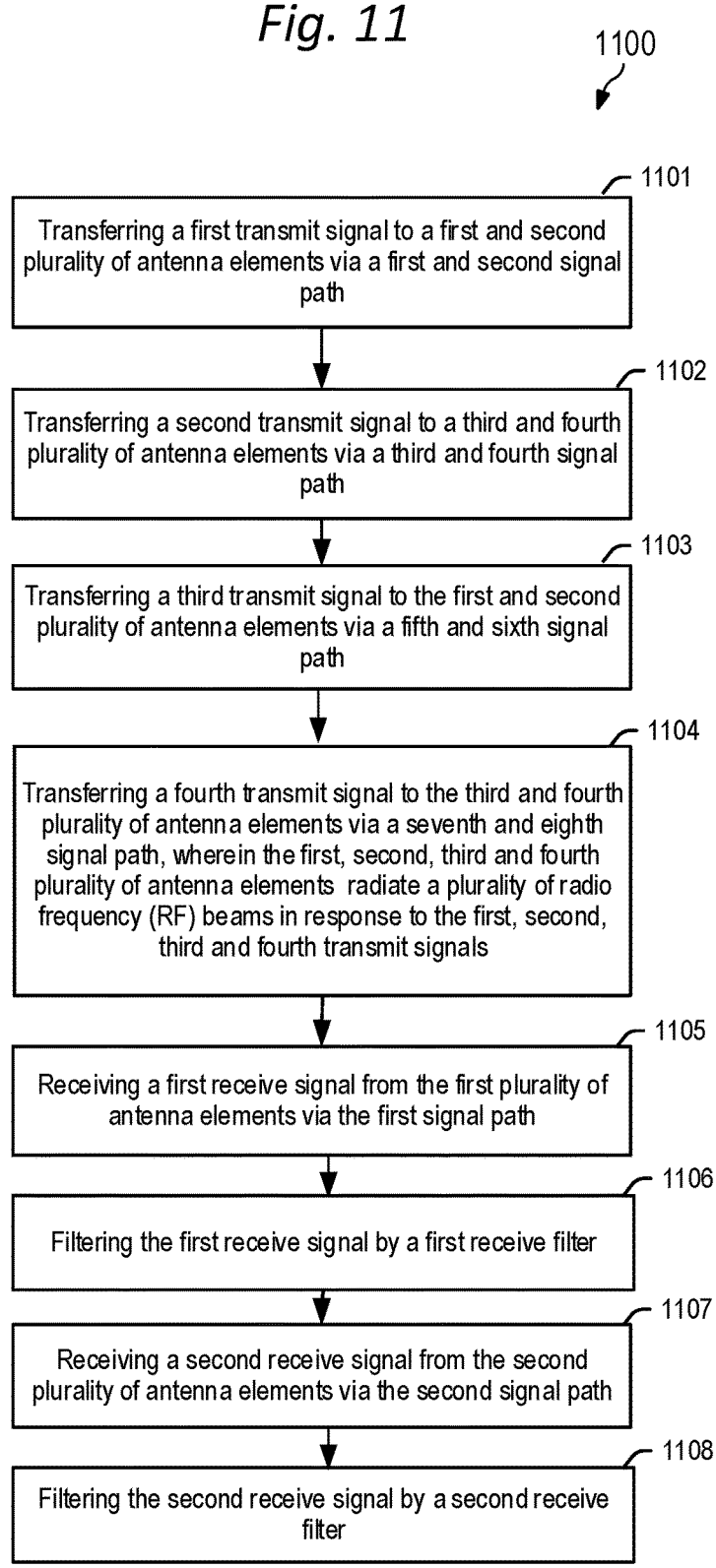

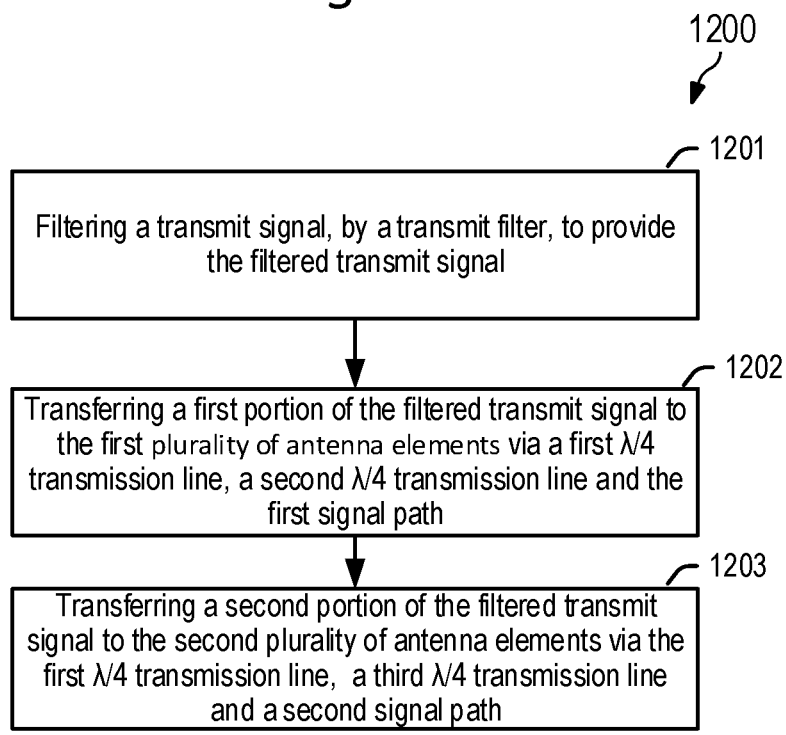

RADIO FREQUENCY DISTRIBUTION NETWORK FOR A SPLIT BEAM USER SPECIFIC TILT ANTENNA

BACKGROUND

Telecommunication systems for wireless or cellular communications often have an antenna, or an array of antenna elements, that emits and receives radio frequency (RF) signals to and from end user equipment (UEs). Complex circuits are used to provide electrical signals to the array of antenna elements so that the appropriate RF signals are radiated to a selected UE. For example, transmitter, power amplifier, hybrid, combiner, duplexer, filter and/or distribution network circuits may be used to radiate an RF signal from an antenna. Similarly, complex circuits may be used to convert a received RF signal to an electrical signal having UE information.

In cross-polarized antenna systems, such as for Long Term Evolution (LTE), an antenna is designed to emit two cross-polarized RF beams at +45° and −45° polarization respectively. Further, the two polarizations are set to the same down-tilt angle, for example 8°, for each of the two polarized beams. Other cross-polarized antennas system having adjustable tilt angles may provide versatile functionality for Multiple-Input and Multiple-Output (MIMO) or beamforming in general, such as versatile elevation or three-dimensional coverage.

Reducing the number of circuits used in a cross-polarized antenna system without affecting signal quality and reliability may significantly reduce the cost of manufacturing the system. Similarly, reducing the number of circuits used may reduce the time needed in testing and/or diagnosing an error in the antenna system. Also, reducing insertion loss caused by certain circuits may provide better antenna system performance and reliability.

SUMMARY

In one embodiment, the present technology relates to an RF distribution network for split beam antennas. The split beam antennas may include four-column cross-polarized user specific tilt antennas implemented in a four transmitter four receiver (4T4R) or four transmitter eight receiver (4T8R) system. A RF distribution network may provide transmit signals from transmitters and power amplifiers to antennas while also providing receive signals from the antennas. A RF distribution network may include four combiners coupled to the antennas and also coupled to two 90° hybrids. A combiner, such as a 180° 6.9 dB combiner, may include a transmission network having three transmission lines in a 4T4R system. Alternatively, a combiner may include a transmission network operating as a duplexer with a transmit filter and two receive filters in a 4T8R system. The transmission network includes a first and second quarter-wave (λ/4) transmission lines coupled between inputs of the two receive filters. A third λ/4 transmission line couples the first and second λ/4 transmission lines to an output of the transmit filter. The transmission network provides isolation between two receive signal paths and, at the same time, provides power splitting of transmitter power to two duplexed transmit signal paths. The two receive filters may have the same passband, while the transmit filter may have a different passband for frequency division duplexing (FDD) embodiment systems In an embodiment, reducing circuit complexity in a RF distribution network circuit reduces insertion loss, which results in improved performance. Reducing circuit complexity may also reduce manufacturing costs and/or increase reliability. Diagnostic testing may also be enhanced by reducing circuit complexity.

In an embodiment, the present technology relates to a circuit comprising a first combiner that is coupled to a first plurality of antenna elements by a first signal path. The first combiner is also coupled to a second plurality of antenna elements by a second signal path. A second combiner is coupled to the first plurality of antenna elements by a third signal path. The second combiner is also coupled to the second plurality of antenna elements by a fourth signal path. A first 90° hybrid is coupled to the first combiner by a fifth signal path and also coupled to the second combiner by a sixth signal path. The first combiner outputs a first transmit signal to the first and second plurality of antenna elements via the first and second signal paths in response to a signal received from the first 90° hybrid via the fifth signal path. The second combiner outputs a second transmit signal to the first and second plurality of antenna elements via the third and fourth signal paths in response to a signal received from the first 90° hybrid via the sixth signal path.

In a further embodiment, the present technology relates to an apparatus comprising: a first, second, third and fourth plurality of antenna elements. A first combiner is coupled to the first and third plurality of antenna elements. A second combiner is coupled to the second and fourth plurality of antenna elements. A third combiner is coupled to the first and third plurality of antenna elements. A fourth combiner is coupled to the second and fourth plurality of antenna elements. A first 90° hybrid is coupled to the first and third combiner. A second 90° hybrid is coupled to the second and fourth combiner. The first, second, third and fourth plurality of antenna elements radiate a first, second, third and fourth RF beam in response a first and second signal received by the first 90° hybrid and a third and fourth signal received by the second 90° hybrid.

In a further embodiment, the present technology relates to a method of operating a circuit comprising transferring a first transmit signal to a first and second plurality of antenna elements via a first and second signal path. A second transmit signal is transferred to a third and fourth plurality of antenna elements via a third and fourth signal path. A third transmit signal is transferred to the first and second plurality of antenna elements via a fifth and sixth signal path and a fourth transmit signal is transferred to the third and fourth plurality of antenna elements via a seventh and eighth signal path. The first, second, third and fourth plurality of antenna elements radiate a plurality of radio frequency (RF) beams in response to the first, second, third and fourth transmit signals.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 7 shows a mapping of baseband ports to achieve four RF beams according to embodiments of the present technology.

FIG. 8 shows a table of a two transmitters (2T) precoding codebook values and corresponding user data beams according to embodiments of the present technology.

FIGS. 11 and 12 are flow diagrams illustrating methods of operating a circuit for an antenna system according to embodiments of the present technology.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1:
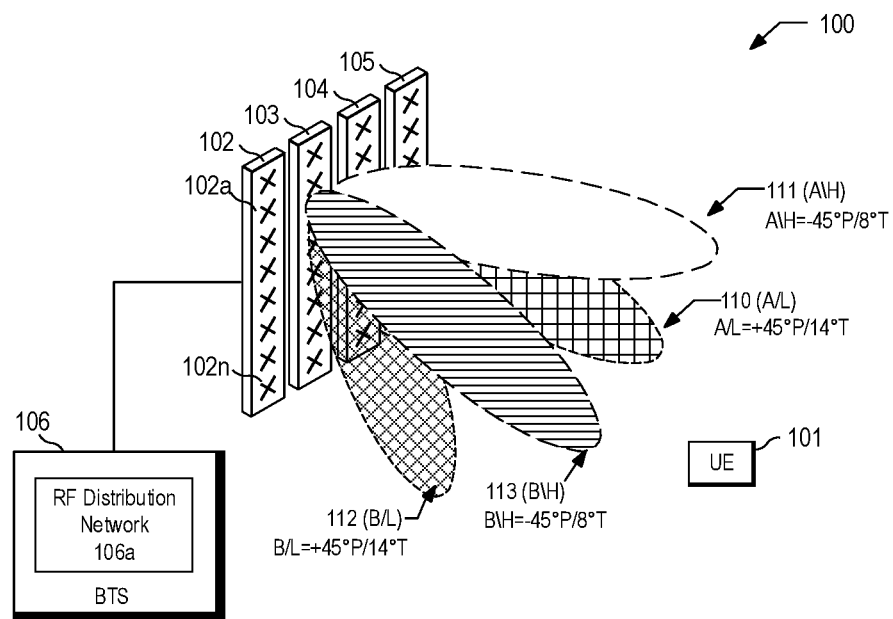
FIG. 1 is a diagram illustrating a split beam cross-polarization user specific tilt angle antenna 4T4R system having a distribution network according to embodiments of the present technology.

The present technology, roughly described, relates to an RF distribution network for a plurality of antenna elements, such as split beam antennas. The split beam antennas may include four-column cross-polarized user specific tilt antennas. A RF distribution network may be included in a 4T4R or 4T8R antenna system. A RF distribution network may provide transmit signals from transmitters and power amplifiers to the split beam antennas while also providing receive signals from the split beam antennas. A RF distribution network may include four combiners, such as 180° 6.9 dB combiners, coupled to the four-column cross-polarized user specific tilt antennas and also coupled two 90° hybrids (also known as a "hybrid coupler" or "hybrid circuit"). In an embodiment, a 180° 6.9 dB combiner may include a transmission network having at least three transmission lines. In alternate embodiment, a 180° 6.9 dB combiner may include a transmit filter, two receive filters and a transmission network. A transmit filter is coupled to two receive filters through a transmission network that provides isolation between the two receive signal paths and, at the same time, provide power splitting of transmitter power to two duplexed transmit signal paths (same as receive signal paths). A transmission network includes first and second quarter-wave ($\lambda/4$) transmission lines coupled between inputs of the two receive filters. A third $\lambda/4$ transmission line couples the first and second $\lambda/4$ transmission lines to an output of the transmit filter. The two receive filters may have the same passband, while the transmit filter may have a different passband in embodiments.

In an embodiment, a pair of Butler matrix networks and a pair of 90° hybrids are replaced with a RF distribution network including four 180° 6.9 dB combiners and various signal paths to antennas. In an embodiment, each of the four 180° 6.9 dB combiners are coupled to two of the four-column cross-polarized user specific tilt antennas. In an embodiments, the distribution network receives transmit signals from two 90° hybrids that receive transmit signals from four transmitters and four power amplifiers that are coupled to four ports of an integrated circuit processor. In an embodiment, receive signals from the antennas may likewise be received by an integrated circuit processor via respective signal paths. Alternatively, receive signals from the antennas may be received by the four 180° 6.9 dB combiners that include filters and a duplexer to provide filtered signals to the integrated circuit processor.

In an embodiment, reducing circuit complexity in a RF distribution network circuit reduces insertion loss, which results in improved performance. Reducing circuit complexity may also reduce manufacturing costs and/or increase reliability. Diagnostic testing may also be enhanced by reducing circuit complexity.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Also, as used herein, the term "approximately" means that the specified value or parameter may be varied within an acceptable tolerance for a given application.

FIG. 1 shows an antenna system 100 having a RF distribution network 106a that may be used for LTE, referred to commonly as a 4T4R system. As described in detail herein, RF distribution network 106a reduces insertion loss leading to better performance by reducing circuit complexity as well as reducing manufacturing cost in embodiments. Antennas 102-105 radiate and receive RF signals to and from, for example, UE 101. Similarly, electrical signals are provided to antennas 102-105 to radiate a radio wave. Similarly, antennas 102-105 receives a radio wave, from example UE 101, that results in an electrical signal. In an embodiment, electronic components and/or circuits used to operate antenna system 100, such as illustrated in FIG. 6B (4T4R system) and FIG. 6C (4T8R system), are housed in base transceiver station (BTS) 106 (also known as "base station"). In alternate embodiments, components or circuits to operate antenna system 100 are located remotely from the physical location of antennas 102-105.

Embodiments of antenna system 100 allow different down-tilt angles for two polarizations of RF beams, also referred to herein as cross-polarized (XP) user specific tilt (UST) antennas. The phrase "user specific" implies that a down-tilting of a RF beam is in accordance of serving different users or group of users, and down-tilt angles may be set according to locations of users (or UEs). Specifically, the down-tilt of two groups or sets of antenna elements in a column of a cross-polarized antenna 102 is set to different angles, such as 8° and 14° in this example. In an embodiment, this allows beam steering capability in the elevation direction, for instance through standard precoding MIMO methods in LTE.

Four RF beams 110, 111, 112 and 114 are provided by antenna system 100. In an embodiment, four RF beams 110-114 are provided by employing a split beam cross-polarized antenna using different down-tilt angles for beams with different polarization. For example, RF beam 110 (A/L) may be a left low beam that has a first polarization and first down-tilt angle, such as +45° polarization and 14° down-tilt (low beam). Similarly, RF beam 112 (B/L) may be a right low beam that has a first polarization and first down-tilt angle, such as +45° polarization and 14° down-tilt (low beam). RF beam 111 (A/H) may be a left high beam that has a second polarization and second down-tilt angle, such as −45° polarization and 8° down-tilt (high beam). Similarly, RF beam 113 (B/H) may be a right high beam that has a second polarization and second down-tilt angle, such as −45° polarization and 8° down-tilt (high beam).

Embodiment systems and methods are provided herein to provide a split beam cross-polarized antenna with different down-tilt angles that support versatile functionality for MIMO or beamforming. In order to support proper MIMO operation, multiple baseband ports of antenna system 100 should have the same coverage in an embodiment. MIMO operation or beamforming functionality in the elevation dimension is provided by having the two polarizations of antennas 102-105 set to different down-tilt angle, such as 8° and 14°.

The embodiments described herein are presented in the context of LTE systems. However, the embodiments provided can be extended to any suitable cellular systems, such as for High Speed Packet Access (HSPA), or other suitable wireless systems, such as for Wireless Local Area Network (WLAN) or Wi-Fi (Institute of Electrical and Electronics Engineers' (IEEE) 802.11x).

Antennas 102-105 include a plurality of antenna elements or an array of elements to radiate and receive RF signals. For example, antenna 102 includes antenna elements 102a-n. In an embodiment, an antenna element includes at least one metal conductor. In an embodiment, antennas 102-105 are four-column XP UST antennas that provide particular split beams to particular or predetermined geographical regions or coverage area.

Figure 2:
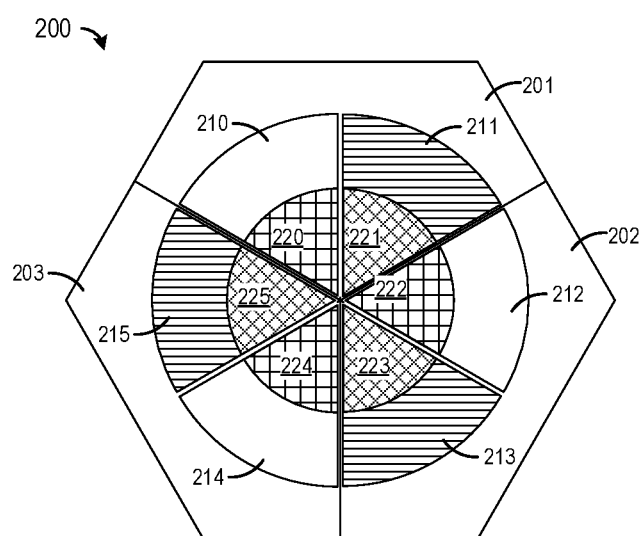
FIG. 2 illustrates a coverage area map associated with different RF beams having different cross polarization and down-tilt angles provided by the system of FIG. 1 according to embodiments of the present technology.
Figures 3, 4, 5:
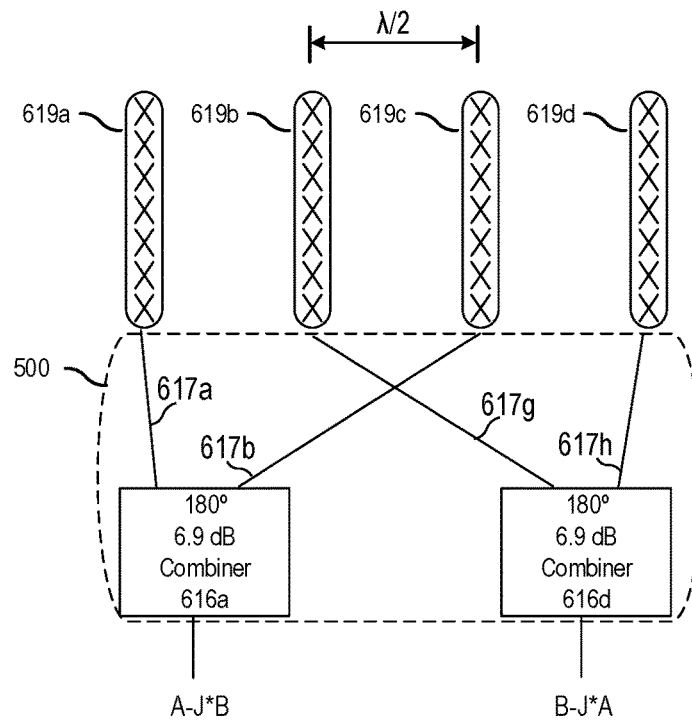
FIGS. 3 and 4 illustrates tables of values at various stages of a distribution network shown in FIG. 6A.
FIG. 5 illustrates a distribution network having reduced complexity for a four column antenna system having a first polarization according to embodiments of the present technology.

FIG. 2 illustrates a coverage area map 200 that represents geographical (or cellular) regions that may be serviced by at least one antenna system 100 of FIG. 1 in an embodiment. A coverage area map 200 may be sectored into three 120° sectors 201-203 with respective antenna systems 100 servicing each of sectors 201-203.

For example, an antenna system 100 located at an approximate center of coverage area map 200 directs four RF beams to geographical regions 210-11 and 220-21 in sector 201. In an embodiment, the four RF beams directed toward sector 201 correspond to RF beams 110-113 shown in FIG. 1 (Each RF beams hatching in FIG. 1 (or lack thereof) matches a corresponding hatching of geographical regions 210-211 and 220-221 shown in FIG. 2). Another antenna system 100 located at an approximate center of coverage area map 200 may also direct four additional RF beams to regions 212-213 and 222-223 in sector 202. Yet still another antenna system 100 located at an approximate center of coverage area map 200 may also direct four additional RF beams to regions 214-215 and 224-225 in sector 203.

According to an example embodiment, multiple polarizations are combined with different down-tilt angles to achieve a coverage pattern similar to that of a six sector communications system. As shown in FIG. 2, the use of a split beam antenna and the combination of two different polarizations and two different down-tilt angles results in two different high tilt beams and two different low tilt beams per sector. Different UEs can be served in each of the four RF beams. A doubling of RF beams effectively double a number of available communications resources in an embodiment. UEs that are under geographical regions of two beams may be scheduled to use the same frequency resource simultaneously. In another embodiment, more than two horizontal beams and two down-tilt angles may be used per 120° sectors to further increase gain.

Coverage of reference signals may need to be adjusted in order to ensure proper standard MIMO processing. Reference signals may be used for synchronization, timing advance, and the like, therefore, coverage of the reference signals is important for operation.

According to an example embodiment, reference signal coverage is equalized between different baseband antenna ports (such as ports 0-4 shown in FIGS. 6B-C) by employing a mapping between baseband antenna ports and RF beams (such as RF beams 110-113 shown in FIG. 1) as presented herein. In a cross-polarized antenna embodiment, four RF beams with two cross-polarizations may be denoted as: A/, B/, A\, and B\, where "I" represents the +45 degree polarization and "V" represents the −45 degree polarization. An exemplary XP embodiment mapping is as follows:

Port 0: A/−j*B/;
Port 1: B/−j*A/;
Port 2: A\−j*B\; and
Port 3: B\−j*A\.

Resulting RF beams for all four baseband antenna ports have identical beam pattern magnitudes and hence, the same coverage according to an embodiment.

As an exemplary XP UST embodiment, four RF beams as shown in FIG. 1 may be represented as follows:

A/L beam—Left beam with +45° polarization and low beam (large down-tilt angle); and B/L beam—Right beam with +45° polarization and low beam (large down-tilt angle);

A\H beam—Left beam with −45° polarization and high beam (small down-tilt angle);

B\H beam—Right beam with −45° polarization and high beam (small down-tilt angle). In an embodiment, a large down-tilt angle is 14° and a small down-tilt angle is 8°.

Multiple mappings between baseband antenna ports and antenna beams are possible in various embodiments. Table 700 shown in FIG. 7 shows a mapping of baseband ports to achieve four XP UST RF beams. An exemplary XP UST embodiment mapping is as follows:

Port 0: A/L−j*A\H−j*B/H−B\L;
Port 1: −j*A/L−A\H+B/H−j*BSL;
Port 2: −A/L−j*A\H−j*B/H+B\L; and
Port 3: −j*A/L+A\H−B/H−j*B\L.

In an embodiment, coverage areas of reference signals for four baseband antenna ports are substantially the same. Due to the additional isolation introduced by different down-tilt angles, more simultaneous UEs (e.g., 4 UEs per sector as shown in coverage area map 200) may be scheduled with low mutual interference, further enhancing communications system throughput and capacity.

Figure 9A:
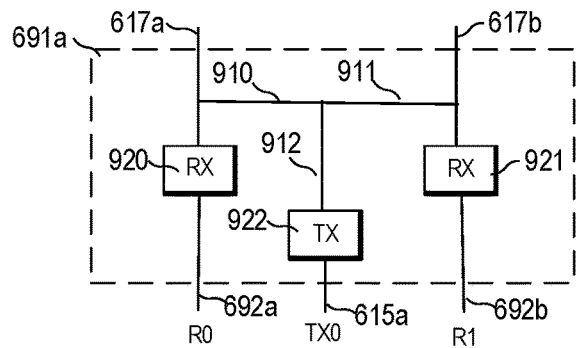
FIG. 9A is a diagram illustrating a 180° 6.9 dB combiner used in a circuit illustrated in FIG. 6C according to embodiments of the present technology.
Figure 9B:
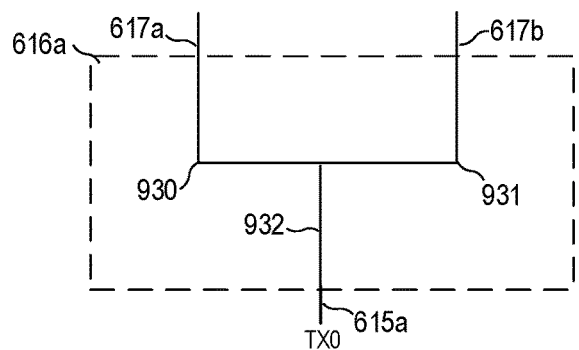
FIG. 9B is a diagram illustrating a 180° 6.9 dB combiner used in a circuit illustrated in FIG. 6B according to embodiments of the present technology.
Figure 10:
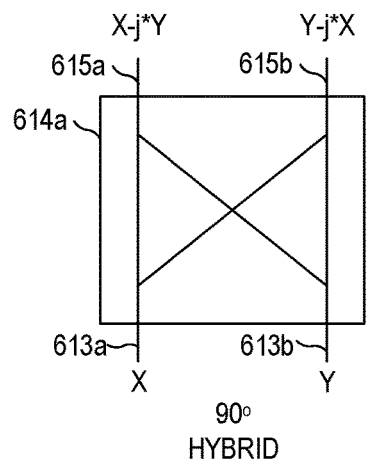
FIG. 10 is a diagram illustrating a 90° hybrid according to embodiments of the present technology.

FIG. 6B is a diagram illustrating a circuit 600 for a 4T4R antenna system 100 having a RF distribution network 650 according to embodiments. RF distribution network 650 corresponds to RF distribution network 106a shown in FIG. 1 in an embodiment. FIGS. 6B and 9B illustrate a structure and operation of a 180° 6.9 dB combiner in RF distribution network 650 while FIG. 10 illustrates the structure and operation of 90° hybrids 614a-b. Similarly, FIG. 9A illustrates a structure and operation of a 180° 6.9 dB combiner in RF distribution network 651 of circuit 690 shown in FIG. 6C of a 4T8R antenna system.

Figure 6A:
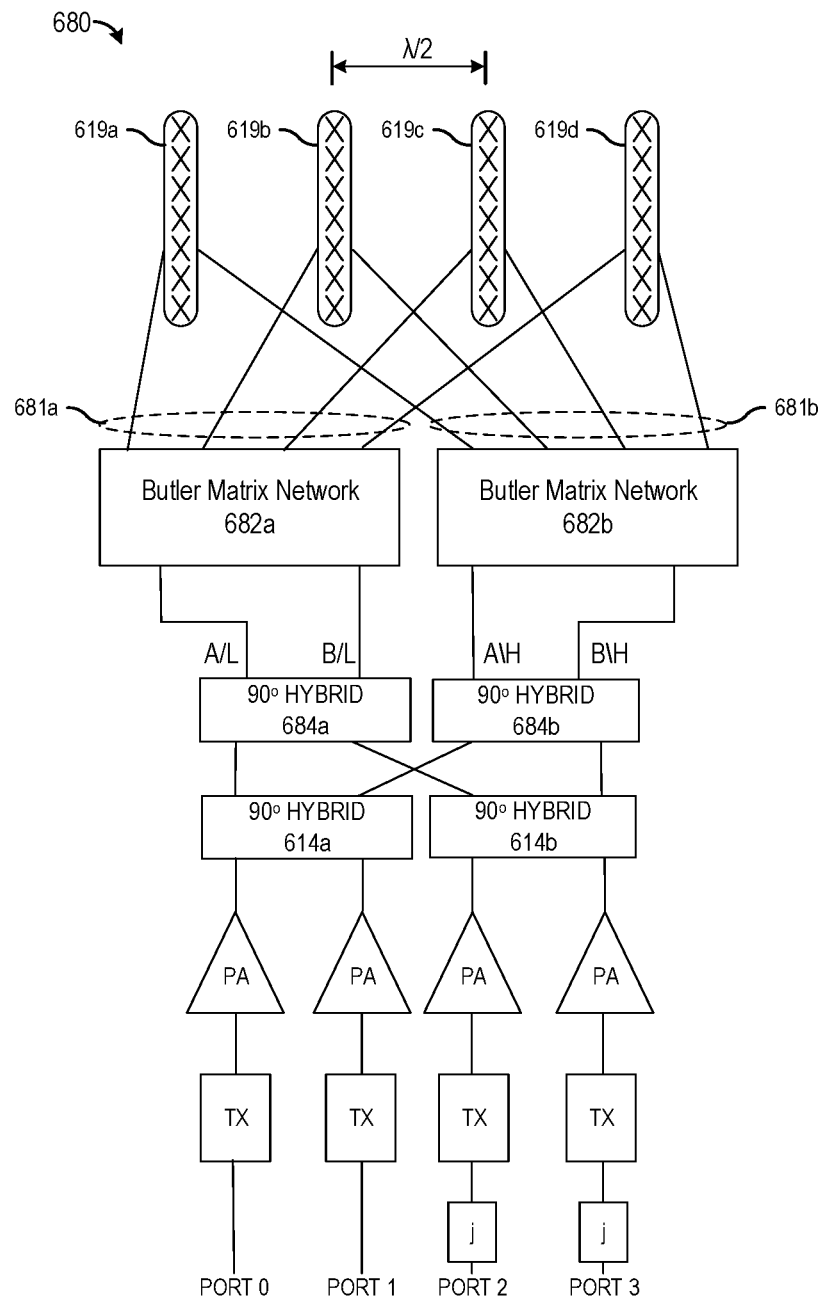
FIG. 6A illustrates a circuit, including a distribution network with Butler matrix networks, to transfer signals to and from four column antennas.
Figure 6B:
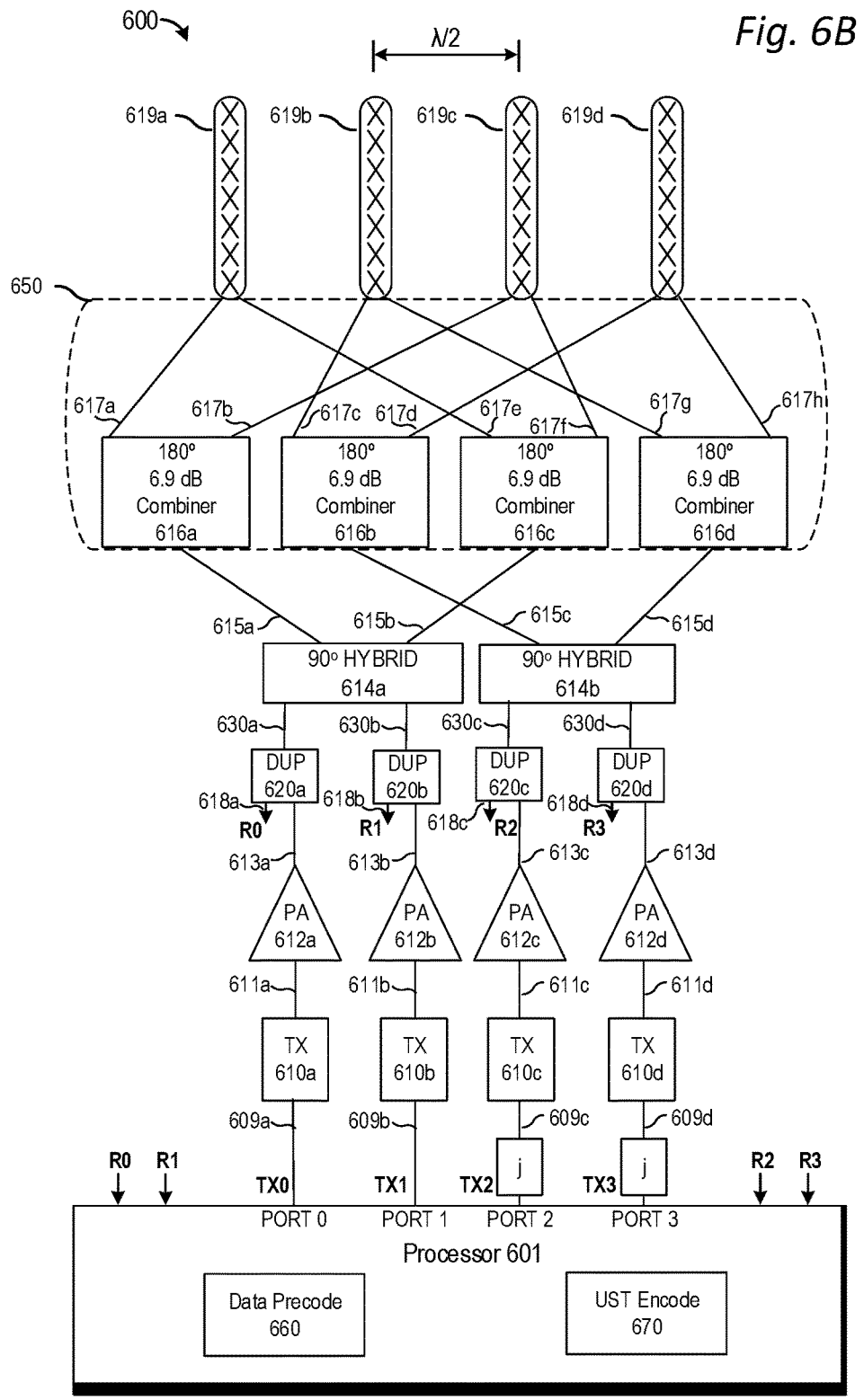
FIG. 6B illustrates a circuit, including a distribution network, to transfer signals to and from antennas in a 4T4R system according to embodiments of the present technology.

In an embodiment, RF distribution network 650 may replace at least two Butler matrix networks 682a-b and two 90° hybrids 684a-b, as illustrated in FIG. 6A, that results in reduced complexity and cost in manufacturing a RF distribution network. FIGS. 4-9B illustrate how Butler matrix networks and a pair of 90° hybrids may be replaced with four 180° 6.9 dB combiners and a reduced amount of signal paths 617a-h in RF distribution network 650.

FIG. 6A illustrates a circuit 680 having a typical RF distribution network for a four-column antenna system. Antennas 619a-d are coupled to Butler matrix networks 682a-b by signal paths 681a-b. Butler matrix networks 682a-b are used to synthesize two split beams using the four-column antennas 619a-d for each polarization. Circuit 680 outputs RF beams denoted as A/L, B/L, ASH and BAH as described herein. 90° hybrids 684a-b are coupled to Butler matrix networks 682a-b and 90° hybrids 614a-b. The two stages of 90° hybrids 684a-b and 614a-b couple all RF beams together to achieve a proper desired UST encoding and power sharing between RF beams.

A typical RF distribution network shown in FIG. 6A may be simplified as illustrated in FIGS. 3-5 and 6B-C. In particular, weighting factors for two split beams (with 6.9 dB tapering) are shown in Table 300 of FIG. 3. When UST coding of A−j*B and B−j*A is used, the resulting values shown in Table 400 of FIG. 4 indicate a simplified RF distribution network may be used. For example, the "0.0000-0.0000i" shown in the first row and second/fourth column of Table 400 indicates that a signal path is not necessary from a Butler matrix network (or replacement circuit component such as 180° 6.9 dB combiner 616a shown in FIG. 5) to a second and fourth antenna (antenna 619b and 619d shown in FIG. 5) because the value output will always be zero or "0.0000-0.0000i" in an embodiment. In particular, FIG. 6B illustrates that Butler matrix networks 682a-b, signal paths 681a-b and 90° hybrids 684a-b shown in FIG. 6A may be replaced with RF distribution network 650 of FIG. 6B or RF distribution network 651 of FIG. 6C (for a 4T8R system). A partial RF distribution network 500 for plurality of antenna elements having a first polarization becomes very simple with two 180° combiners having a combining ratio of 6.9 dB (180° 6.9 dB combiner 616a and 616d) along with signal paths 617a-b and 617g-h shown in FIG. 5 (See RF distribution networks 650-651 for a plurality of antenna elements having first and second polarizations shown in FIGS. 6B-C for RF distribution network embodiments).

As illustrated in FIG. 6B, one or more of 180° 6.9 dB combiners 616a-d may include a transmission network as illustrated in FIG. 9B. In an embodiment, one or more of 180° 6.9 dB combiners 616a-d include a transmission network having transmission lines 930-932. In an embodiment, transmission line 930 is coupled to signal path 617a; transmission line 931 is coupled to signal path 617b and transmission line 930; and transmission line 932 is coupled to signal path 615a and transmission lines 930 and 931.

Figure 6C:
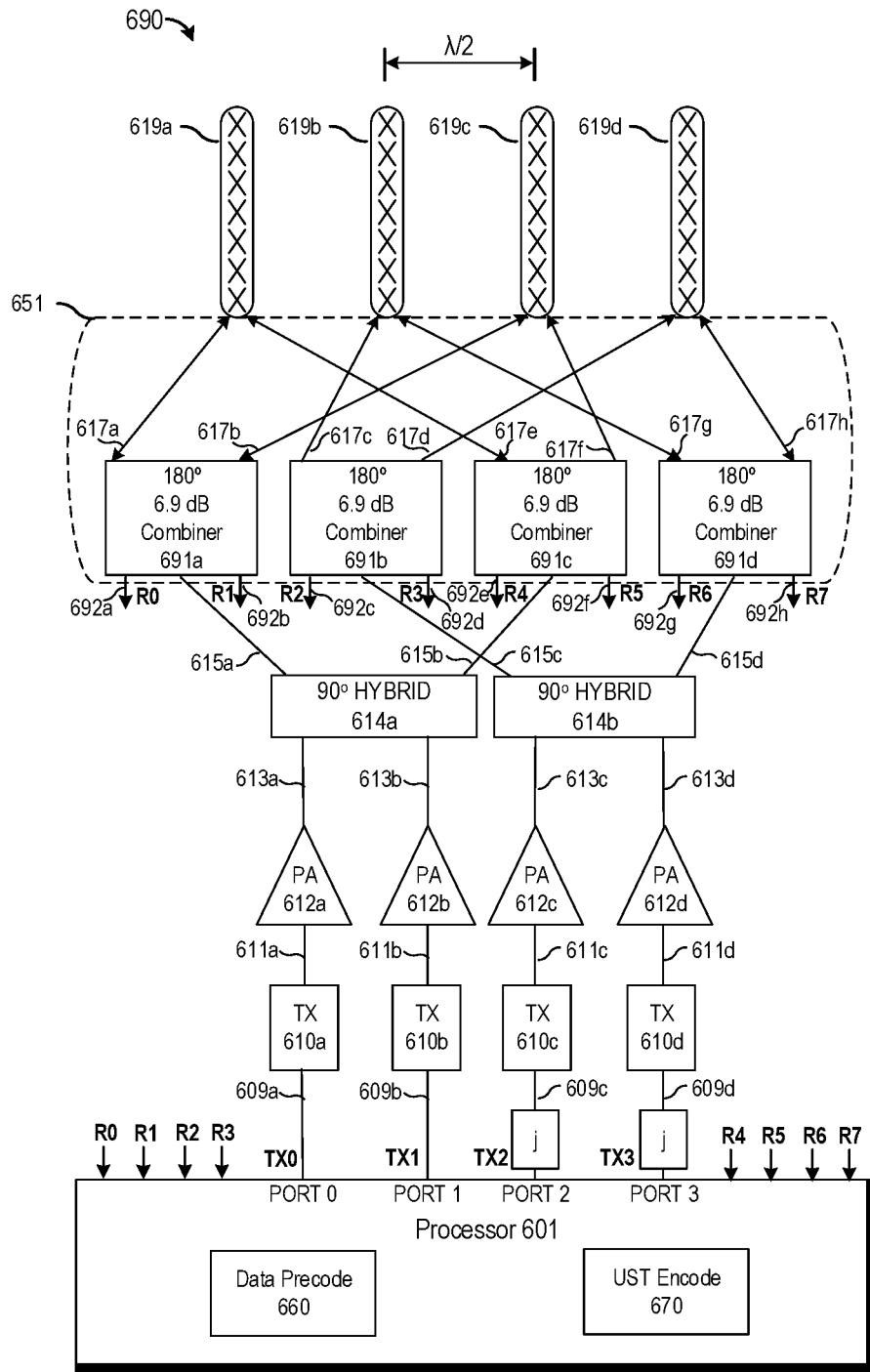
FIG. 6C illustrates a circuit, including a distribution network, to transfer signals to and from antennas in a 4T8R system according to embodiments of the present technology.

In an alternate embodiment illustrated in FIG. 6C, one or more of 180° 6.9 dB combiners 691a-d replace the functionality of a duplexer and combiner circuit, which may result in reduced transmit filters and cost of manufacturing a circuit 690 shown in FIG. 6C. Furthermore, circuit 690 may be easier to troubleshoot and test due to the reduction in circuit components used as well as be more reliable. Rather than using a duplexer and combiner circuit, one or more of 180° 6.9 dB combiners 691a-d includes two receive filters coupled to first and second λ/4 transmission lines while a third λ/4 transmission line is coupled to a single transmit filter and the first and second λ/4 transmission lines in an embodiment. Further, using two receivers and corresponding receive filters may increase diversity on an uplink, which may result in improved uplink performance.

Returning to FIG. 6B, a processor 601 having ports 0-4 output transmit signals TX0-3 (or coded signals) to inputs of transmitters (TXs) 610a-d via signal paths 609a-d. Transmit signals are output from TXs 610a-d to inputs of power amplifiers (PAs) 612a-d via signal paths 611a-d. PAs 612a-d output amplified transmit signals to inputs of duplexers (DUP) 620a-d via signal lines 613a-d. Duplexers 620a-d output amplified transmit signals to 90° hybrids 614a-b via signal paths 630a-d. 90° hybrids 614a-b provide a phase difference and/or mixing between two amplified transmit signals on signal paths 630a-b and 630c-d and output resulting mixed transmit signals on signal paths 615a-d to RF distribution network 650.

Processor 601 also receives receive signals R0-R3 from antennas 619a-d via duplexers 620a-d via signal paths 618a-d.

RF distribution network 650 includes 180° 6.9 dB combiners 616a-d and signal paths 617a-h in an embodiment. 180° 6.9 dB combiners 616a-d receive transmit signals via signal paths 615a-d from hybrids 614a-b and outputs transmit signals to antennas 619a-d via signal paths 617a-h. FIG. 9B illustrates one or more 180° 6.9 dB combiners 616a-d having a transmission network including three transmission lines 930-932 in an embodiment.

Antennas 619a-d are single-column XP UST antennas in an embodiment, which operates similar to antennas 102-105 shown in FIG. 1. Antennas 619a-d radiate and receive RF signal to and from UEs, as illustrated in FIGS. 1 and 2. In an embodiment, antennas 619a-d includes a plurality or an array of antenna elements partitioned or grouped to operate as separate antenna portions. For example, an antenna portion may radiate a first beam to a first UE while another antenna portion radiates a second beam to a second UE. In an embodiment, antennas 619a-d include a plurality of antenna elements having first and second polarizations.

In an embodiment, processor 601 includes decoding software components and/or circuits that decodes receive signals R0-R7 shown in FIGS. 6B-C. In an embodiment, processor 601 also includes transfer and interface software components and/or circuits to transfer user data in receive signals to a predetermined destination, such as a remote server, via a wired or wireless connection. In an embodiment, user data is transferred from processor 601, at least in part, by the Internet.

In embodiments, processor 601 may be an integrated circuit processor with one or more cores, digital signal processor, baseband circuit, field programmable gate array, digital logic circuit and/or equivalent to output and receive signals to and from antennas 619a-d. In embodiments, processor 601 may include one or more ports to output and receive signals. In an embodiment, a processor 601 may include receive circuits to receive signals R0-R7. In embodiments, processor 601 may include circuits and/or software components to provide user data, precoding and UST encoding to signals (coded signals) as well as decoding receive signals. In an embodiments, software components include machine readable (executable) instructions (or code) that may be stored in volatile or non-volatile memory, such as an integrated circuit memory, accessible by processor 601.

In an embodiment, processor 601 executes a data precoding software component (Data Precode) 660 and UST encode software component (UST Encode) 670 to precode data and encode user specific tilt information to coded signals output from processor 601 at ports 0-3. In an embodiment, Data Precode 660 and UST Encode 670 are stored in an integrated circuit memory.

FIG. 6C illustrates a circuit 690 having a RF distribution network 651 that may be used in a 4T8R antenna system. In an embodiment, 180° 6.9 dB combiners 691*a-d* filter transmit signals using a single transmit filter and outputs the filtered transmit signal to duplexed signal paths coupled to pairs of antennas. In particular, 180° 6.9 dB combiner 691*a* outputs a first filtered transmit signal to antennas 619*a*, 619*c* via signal paths 617*a-b*. 180° 6.9 dB combiner 691*b* outputs a second filtered transmit signal to antennas 619*b*, 619*d* via signal paths 617*c-d*. 180° 6.9 dB combiner 691*c* outputs a third filtered transmit signal to antennas 619*a*, 619*c* via signal paths 617*e-f*. 180° 6.9 dB combiner 691*d* outputs a fourth filtered transmit signal to antennas 619*b*, 619*d* via signal paths 617*g-h*.

Receive signals from antennas 619*a-d* are provided to 180° 6.9 dB combiners 691*a-d* via signal paths 617*a-h*. In embodiments, filtered receive signals R0-R7 are then output from 180° 6.9 dB combiners 691*a-d* as described herein and illustrated in FIGS. 6C and 9A. In an embodiment, separate receive filters in 180° 6.9 dB combiners 691*a-d* are used for outputting filtered receive signals, such as receive signals R0 and R1 shown in FIG. 9A. In an embodiment, filtered receive signals R0-R7 from antennas 619*a-d* are input to one or more ports of processor 601 via signal paths 692*a-h*.

As illustrated in FIG. 6C, amplified transmit signals are provided from PAs 612*a-d* to 90° hybrids 614*a-b* via signal paths 613*a* without the use of duplexers 620*a-d*, as shown in FIG. 6B, in embodiments.

While circuits 600 and 690 illustrate 180° 6.9 dB combiners, other types of combiners may be used in alternate embodiments. For example, at least one of 180° 6.9 dB combiners 691*a-d* and 616*a-d* may be a 170° 8.0 dB combiner. In embodiments, combiners may be used or are selected from a group consisting of combiners ranging from a 150° combiner to a 210° combiner and combiners ranging from a 5.0 dB combiner to a 9.0 dB combiner.

Four-column XP UST antennas 619*a-d* in circuits 600 and 690 may be extended to any number of suitable columns (e.g., 8 columns) in embodiments. A spacing between column antennas 619*a-d* may be a half an operation wavelength (λ/2). Circuits 600 and 690 may produces split beams in the horizontal dimension as well as a vertical dimension in an embodiment.

For embodiments with users distribution having significant elevation distribution, such as in tall buildings, two columns of antenna elements with different down-tilt angles can be used to split a sector into two elevation coverage zones, which is referred to herein as vertical sectorization, offering sectorization gain. Four-column XP UST antenna systems may also improve cell throughput through better Multi-User-MIMO (MU-MIMO) performance. In an embodiment, users can intelligently feedback a Precoding Matrix Indicators (PMI) selection by considering not only their own performance, but also the performance of the entire network.

In embodiments, circuits 600 and 690 provide 1) a simple RF distribution network, 2) full power available to far away UEs, and 3) suitability for integrated Active Antenna Systems (AASs). In embodiments, phase control from power amplifier outputs to antennas and phase calibration of transmitters may be used.

FIG. 8 shows a Table 800 of 2T precoding codebook values and corresponding user data beams that may be achieved using an antenna system 100 of FIG. 1. Table 800 shows that different PMIs correspond to beams with different down-tilt angles and other characteristics.

Receiver processing in an UE 101 sends to a BTS 106, the best PMI by selecting an antenna beam that provides the best throughput. However, when an UE 101 receiver can factor in an impact of its data beams to the rest of the network, and feedback a PMI which provides the best overall network throughput, the overall network edge performance can be significantly enhanced, for example by more than about 30%, in an embodiment. This can be accomplished by an UE 101 receiver adding a PMI dependent offset to its calculation of the achievable throughput for all the PMI code words in an embodiment. This modifies the PMI feedback from UE 101, and is referred to herein as intelligent PMI selection.

FIG. 9A illustrates 180° 6.9 dB combiner 691*a* as shown in FIG. 6C in an embodiment. 180° 6.9 dB combiners 691*b-d*, in an embodiment, have a similar structure and operates similarly to 180° 6.9 dB combiner 691*a*. In an embodiment, 180° 6.9 dB combiner 691*a* eliminates the need to use an additional transmit TX filter. In an embodiment, 180° 6.9 dB combiner 691*a* includes a single TX filter 922 and two receive (RX) filters 920-21. 180° 6.9 dB combiner 691*a* is at least different than a typical triplexer because RX filters 920-21 have a passband that is different than to passband for TX filter 922.

In an embodiment, TX filter 922 is designed such that its input impedance at receive frequencies is a short circuit that provides isolation between RX filters 920-21 while supporting duplexing action on signal paths 617*a-b*. λ/4 transmission lines 910 and 911 transforms a short circuit at the input of a TX filter 922 to an open circuit at RX filters' 920 and 921 inputs, allowing RX filters 920-21 to function typically. RX filters 920-21 may be designed with a very large input impedance (preferably infinite) at transmit frequencies so that a TX filter 922 functions typically. However, typical filters present an open circuit away from the passband. A λ/4 transmission line (912) then may be used to transform the open circuit to a short circuit as shown in FIG. 9A.

In particular, 180° 6.9 dB combiner 691*a* includes two RX filters 920 and 921 as well as a TX filter 922. In an embodiment, RX filters 920 and 921 allow approximately the same frequency range of signals to pass and attenuate or reject other input signals that are not in a predetermined frequency range (passband). In an embodiment, TX filter 922 has a different passband than RX filters 920 and 921. A transmission network is used to transfer signals to and from RX filters 920 and 921 as well as to and from TX filters 922. In an embodiment, received signals are provided to respective RX filters 920 and 921 inputs via signal paths 617*a* and 617*b* in a transmission network while filtered received signals, such as R0 and R1 signals, are output via signal paths 692*a* and 692*b* in the transmission network. A transmit signal TX0 is transferred to TX filter 922 via signal path 615a in the transmission path network while a filtered transmit signal is output from TX filter 922 to an antenna via λ/4 transmission lines 910-912 and signal path 617a and 617b. In an embodiment, a first and second λ/4 transmission line 910 and 911 are coupled between inputs of RX filters 920 and 921 while a third λ/4 transmission line 912 is coupled between the output of a TX filter 922 and the first and second λ/4 transmission lines 910 and 911. In an embodiment, λ/4 transmission lines 910 and 911 allow for isolation between two receive signal paths (signal paths 617a and 617b) and, at the same time, provides power splitting of the transmit power of a filtered transmit signal from a TX filter 922 to two duplexed signal paths (signal paths 617a and 617b). In an embodiment, power splitting of a filtered transmit signal from TX filter 922 to signal paths 617a and 617b is even as the impedance values of λ/4 transmission lines 910-912 is the same. In an embodiment, λ/4 transmission line 910 has an impedance value of approximately 50 ohms; λ/4 transmission line 911 has an impedance value of approximately 50 ohms; and λ/4 transmission line 912 has an impedance value of approximately 50 ohms to achieve a 6.9 dB even combining.

In an embodiment, either signal path 617a or 617b includes a half-wave (λ/2) transmission line to produce a 180° phase difference and has an impedance value of approximately 50 ohms.

FIG. 9B illustrates 180° 6.9 dB combiner 616a, as shown in FIG. 6B, having a transmission network with a plurality of transmission lines in an embodiment. 180° 6.9 dB combiners 616b-d, in an embodiment, have a similar structure and operates similarly to 180° 6.9 dB combiner 616a. In an embodiment, a transmission network includes transmission lines 930-932 as shown in FIG. 6B. In an embodiment, transmission line 930 is coupled to signal path 617a and transmission line 931 is coupled to signal path 617b. Transmission line 932 is coupled to transmission lines 930 and 931 as well as signal path 615a. In an embodiment, transmission line 930 is a λ/4 transmission line and transmission line 931 is a three-quarter-wave (¾λ) transmission line to produce a 180° phase shift. In an embodiment where a 180° phase shift is not needed, transmission line 931 is λ/4 transmission line. In an embodiment, transmission line 930 has an impedance value of approximately 30 ohms; transmission line 931 has an impedance value of approximately 42 ohms; and transmission line 932 has an impedance value of approximately 50 ohms to achieve a 6.9 dB uneven combining.

FIG. 10 illustrates a circuit diagram of a 90° hybrid 614a as shown in FIGS. 6A-C according to an embodiment. 90° hybrid 614b shown in FIGS. 6A-C has a similar structure and operates similarly to 90° hybrid 614a in an embodiment. 90° hybrid 614a includes two input ports coupled to signal paths 613a-b (or signal paths 630a-b) and two output ports coupled to signal paths 615a-b. In an embodiment, 90° hybrid 614a mixes two input signals and outputs two output signals. In particular, when two input signals X and Y are input to 90° hybrid 614a via signal paths 613a-b, two resulting output signals X−j*Y and Y−j*X are output via signal paths 615a-b in an embodiment.

FIG. 11 illustrates a method 1100 of operating a circuit in an antenna system, such as a split beam XP UST system according to an embodiment. In an embodiment, method 1100 describes a method of operating one or more circuits for a plurality or an array of antenna elements. In an embodiment, an array or plurality of antenna elements may be included in at least four-column antennas. In embodiments, circuits 600 and 690 shown in at least FIG. 6B-C are used to perform at least a portion of method 1100. Method 1100 initiates by transferring a first transmit signal to a first and second plurality of antenna elements via a first and second signal path as illustrated by logic block 1101. In an embodiment, the first and second signal paths correspond to signal paths 617a and 617b while the first and second plurality of antenna elements correspond to antennas 619a and 619c shown in FIGS. 6B-C. In an embodiment, a method 1200 illustrated in FIG. 12 and described herein is used to perform at least some of the functions of logic block 1101. In embodiments, method 1200 illustrated in FIG. 12 is used to perform at least some of the functions of logic blocks 1102-1103 as well.

Logic block 1102, similar to logic block 1101, illustrates transferring a second transmit signal to a third and fourth plurality of antenna elements via a third and fourth signal path. In an embodiment, the third and fourth signal paths correspond to signal paths 617c and 617d while the third and fourth plurality of antenna elements correspond to antennas 619b and 619d shown in FIG. 6B-C.

Logic block 1103, similar to logic block 1101-1102, illustrates transferring a third transmit signal to the first and second plurality of antenna elements via a fifth and sixth signal path. In an embodiment, the third and fourth signal paths correspond to signal paths 617e and 617f while the third and fourth plurality of antenna elements correspond to antennas 619a and 619c shown in FIG. 6B-C.

Logic block 1104, similar to logic blocks 1101-1103 illustrates transferring a fourth transmit signal to the third and fourth plurality of antenna elements via a seventh and eighth signal path. In addition, logic block 1104 illustrates first, second, third and fourth plurality of antenna elements radiating a plurality of RF beams in response to the first, second, third and fourth transmit signals. In an embodiment, the seventh and eighth signal paths correspond to signal paths 617g and 617h while the third and fourth plurality of antenna elements correspond to antennas 619b and 619d shown in FIG. 6B-C.

Logic block 1105 illustrates receiving a first receive signal from the first plurality of antenna elements via the first signal path. In an embodiment, a receive signal may be received via signal path 617a from antenna 619a as illustrated in FIGS. 6C and 9A.

Logic block 1106 illustrates filtering the first receive signal by a first receive filter. In an embodiment, a first receive filter corresponds to receive RX filter 920 shown in FIG. 9A.

Logic block 1107 illustrates receiving a second receive signal from the second plurality of antenna elements via the second signal path. In an embodiment, a receive signal may be received via signal path 617b from antenna 619c as illustrated in FIGS. 6C and 9A.

Logic block 1108 illustrates filtering the second receive signal by a second receive filter. In an embodiment, a second receive filter corresponds to RX filter 921 shown in FIG. 9A.

FIG. 12 illustrates a method 1200 that may be used to perform at least some of the functions of logic blocks 1101-1104 in embodiments. Logic block 1201 illustrates filtering a transmit signal, by a transmit filter, to provide a filtered transmit signal. In an embodiment, TX filter 922 shown in FIG. 9A filters a transmit signal on signal path 615a to output the filtered transmit signal.

Logic block 1202 illustrates transferring a first portion of the filtered transmit signal to the first plurality of antenna elements via a first λ/4 transmission line, a second λ/4 transmission line and the first signal path. In an embodiment, the first and second λ/4 transmission lines correspond to λ/4 transmission lines 910 and 912 while the first plurality of antenna elements and first signal path corresponds to antenna 619a and signal path 617a shown in FIGS. 6C and 9A.

Logic block 1203 illustrates transferring a second portion of the filtered transmit signal to the second plurality of antenna elements via the first λ/4 transmission line, a third λ/4 transmission line and second signal path. In an embodiment, the first and third λ/4 transmission lines correspond to λ/4 transmission lines 911 and 912 while the second plurality of antenna elements and second signal path corresponds to antenna 619c and signal path 617b shown in FIGS. 6C and 9A.

The flowcharts and block diagrams in the figures illustrate the architecture, functionality, and operation of possible implementations of systems (including circuits) and methods according to various aspects of the present disclosure. In this regard, each block in the flowchart or block diagram (or arrow in sequence diagram) may represent operations of a system component or circuit for implementing the specified logical function(s). It should also be noted that, in some alternative implementations, the functions noted in the block may occur out of the order noted in the figures. For example, two blocks (or arrows) shown in succession may, in fact, be executed substantially concurrently, or the blocks (or arrows) may sometimes be executed in the reverse order, depending upon the functionality involved. It will also be noted that each block of the block diagrams or arrows and/or flowchart illustration, and combinations of blocks in the block diagrams or arrows and/or flowchart illustration, can be implemented by special purpose hardware-based systems that perform the specified functions or acts, or combinations of special purpose hardware and computer instructions.

In embodiments, a signal path (described herein and/or illustrated in the figures) may include, but is not limited to, one or more of a wire, trace, transmission line, track, pad, layer, lead, metal, portion of a printed circuit board or assembly, conducting material and other material that may transfer or carry an electrical signal, light pulse and/or frequency. In embodiments, a signal path may form one or more geometric shapes, such as a line or multiple connected lines.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A circuit comprising:
    a first radio frequency (RF) combiner coupled to a first plurality of antenna elements by a first signal path and coupled to a second plurality of antenna elements by a second signal path;
    a second RF combiner coupled to the first plurality of antenna elements by a third signal path and coupled to the second plurality of antenna elements by a fourth signal path; and
    a first 90° hybrid coupled to the first RF combiner by a fifth signal path and coupled to the second RF combiner by a sixth signal path,
    wherein the first RF combiner outputs a first transmit signal to the first and second plurality of antenna elements, each having a same polarization, via the first and second signal paths in response to a signal received from the first 90° hybrid via the fifth signal path,
    wherein the second RF combiner outputs a second transmit signal to the first and second plurality of antenna elements, each having a same polarization, via the third and fourth signal paths in response to a signal received from the first 90° hybrid via the sixth signal path.

2. The circuit of claim 1, wherein the first and second RF combiners are 180° 6.9 dB combiners.

3. The circuit of claim 1, wherein the first and second RF combiners are selected from a group consisting of combiners ranging from a 150° combiner to a 210° combiner and combiners ranging from a 5.0 dB combiner to a 9.0 dB combiner.

4. The circuit of claim 1, comprising:
    a third RF combiner coupled to a third plurality of antenna elements by a seventh signal path and coupled to a fourth plurality of antenna elements by a eighth signal path;
    a fourth RF combiner coupled to the third plurality of antenna elements by a ninth signal path and coupled to the fourth plurality of antenna elements by a tenth signal path; and
    a second 90° hybrid coupled to the third RF combiner by a tenth signal path and coupled to the fourth RF combiner by an eleventh signal path,
    wherein the third RF combiner outputs a third transmit signal to the first polarization of the third and fourth plurality of antenna elements via the seventh and eighth signal paths in response to a signal received from the second 90° hybrid via the tenth signal path,
    wherein the fourth RF combiner outputs a fourth transmit signal to the third and fourth plurality of antenna elements via the ninth and tenth signal paths in response to a signal received from the second 90° hybrid via the eleventh signal path.

5. Circuit of claim 4, wherein the first, second, third and fourth plurality of antenna elements include a first and second polarization.

6. The circuit of claim 1, wherein the first plurality of antenna elements are arranged as a first column antenna and the second plurality of antenna elements are arranged as a second column antenna.

7. The circuit of claim 6, wherein the first and second column antennas are single-column cross-polarized user specific tilt antennas.

8. The circuit of claim 1, wherein the first RF combiner includes a transmission network having a first, second and third transmission line.

9. The circuit of claim 8, wherein the first transmission line is coupled to the first signal path, wherein the second transmission line is coupled to the second signal path, and wherein the third transmission line is coupled to the fifth signal path.

10. The circuit of claim 1, comprising:
a first transmitter;
a first amplifier, coupled to the first transmitter and the first 90° hybrid, to amplify and output a first signal to the first 90° hybrid;
a second transmitter; and
a second amplifier, coupled to the second amplifier and the first 90° hybrid, to amplify and output a second signal to the first 90° hybrid.

11. The circuit of claim 10, comprising:
an integrated circuit processor, coupled to the first and second transmitters, to output coded signals to the first and second transmitters, wherein the integrated circuit processor receives a first and second receive signal from the first and second plurality of antenna elements via a first receive signal path and a second receive signal path.

12. The circuit of claim 11, wherein the integrated circuit processor outputs coded signals for multiple-input and multiple-output (MIMO) in Long Term Evolution (LTE) communications.

13. The circuit of claim 11, wherein the integrated circuit processor comprises:
a user specific tilt (UST) encoding block to encode the coded signals; and
a data precoding block coupled to the UST encoding block to encode the coded signals.

14. An apparatus comprising:
a first plurality of antenna elements;
a second plurality of antenna elements;
a third plurality of antenna elements;
a fourth plurality of antenna elements;
a first radio frequency (RF) combiner coupled to the first and third plurality of antenna elements having a first polarization;
a second RF combiner coupled to the second and fourth plurality of antenna elements having second polarization;
a third RF combiner coupled to the first and third plurality of antenna elements having the first polarization;
a fourth RF combiner coupled to the second and fourth plurality of antenna elements having the second polarization;
a first 90° hybrid coupled to the first and third RF combiner; and
a second 90° hybrid coupled to the second and fourth RF combiner, wherein the first, second, third and fourth plurality of antenna elements radiate a first, second, third and fourth RF beam in response a first and second signal received by the first 90° hybrid and a third and fourth signal received by the second 90° hybrid.

15. The apparatus of claim 14, wherein the first, second, third and fourth RF combiners are 180° 6.9 dB combiners.

16. The apparatus of claim 14, wherein the first, second, third and fourth plurality of antenna elements include a first and second polarization.

17. The apparatus of claim 14, wherein the first, second, third and fourth RF combiners are selected from a group consisting of combiners ranging from a 150° combiner to a 210° combiner and combiners ranging from a 5.0 dB combiner to a 9.0 dB combiner.

18. The apparatus of claim 14, wherein the first, second, third and fourth RF beams are radiated toward a 60° sector in a geographical region, wherein the first RF beam is a left beam having a first polarization and first down-tilt angle, wherein the second RF beam is a right beam having the first polarization and first down-tilt angle, wherein the third RF beam is a left beam having a second polarization and second down-tilt angle and wherein the fourth RF beam is a right beam having a second polarization and second down-tilt angle, wherein the second polarization is different from the first polarization, and wherein the first down-tilt angle is different than the second down-tilt angle.

19. The apparatus of claim 14, wherein the first, second, third and fourth plurality of antenna elements are arranged as a first, second, third and fourth column antenna.

20. The apparatus of claim 14, wherein the first RF combiner comprises:
a first receive filter having an input to receive a first receive signal via a first signal path from the first plurality of antenna elements;
a second receive filter having an input to receive a second receive signal via a second signal path from the third plurality of antenna elements;
a first λ/4 transmission line coupled to the input of the first receive filter;
a second λ/4 transmission line coupled to the input of the second receive filter;
a third λ/4 transmission line coupled to the first and second λ/4 transmission lines; and
a transmit filter having an input to receive a transmit signal, the transmit filter having an output, coupled to the third λ/4 transmission line, to output a filtered transmit signal to the first and third plurality of antenna elements via the third λ/4 transmission line, the first λ/4 transmission line, the second λ/4 transmission line, the first signal path and the second signal path.

21. The apparatus of claim 20, wherein the filtered transmit signal is transferred to the first plurality of antenna elements via the third λ/4 transmission line, the first λ/4 transmission line and the first signal path.

22. The apparatus of claim 21, wherein the filtered transmit signal is transferred to the third plurality of antenna elements via the third λ/4 transmission line, the second λ/4 transmission line and the second signal path.

23. Apparatus of claim 22, wherein the first λ/4 transmission line has a first impedance value, the second λ/4 transmission line has a second impedance value and the third λ/4 transmission line has a third impedance value, wherein the first, second and third impedance values are approximately equal.

24. The apparatus of claim 23, wherein the first and second receive filters have a first passband and the transmit filter has a second passband that is different from the first passband.

25. The method of claim 24, wherein the plurality of RF beams include a first, second, third and fourth RF beam radiated toward a sector in a coverage area, wherein the first and second RF beams are radiated with a first and second tilt angle and a first and second polarization, and wherein the third and fourth RF beams are radiated with the first and second tilt angles and the first and second polarizations.

26. The method of claim 24, wherein transferring the first transmit signal comprises:
filtering, by a transmit filter, to provide the first transmit signal;
transferring a first portion of the first transmit signal to the first plurality of antenna elements via a first λ/4 transmission line, a second λ/4 transmission line and the first signal path; and
transferring a second portion of the first transmit signal to the second plurality of antenna elements via the first λ/4 transmission line, a third λ/4 transmission line and the second signal path.

27. The method of claim 26, further comprising:
receiving a first receive signal from the first plurality of antenna elements via the first signal path;
filtering the first receive signal by a first receive filter;
receiving a second receive signal from the second plurality of antenna elements via the second signal path; and
filtering the second receive signal by a second receive filter.

28. The method of claim 27, wherein the first, second, third and fourth plurality of antenna elements are a first, second, third and fourth single-column cross-polarized user specific tilt antenna.

29. The method of claim 27, wherein the first, second, third and fourth plurality of antenna elements include a first and second polarization.

30. A method of operating a circuit, the method comprising:
transferring a first transmit signal to a first and second plurality of antenna elements having a first polarization via a first and second signal path;
transferring a second transmit signal to a third and fourth plurality of antenna elements having a second polarization via a third and fourth signal path;
transferring a third transmit signal to the first and second plurality of antenna having the first polarization elements via a fifth and sixth signal path; and
transferring a fourth transmit signal to the third and fourth plurality of antenna elements having the second polarization via a seventh and eighth signal path,
wherein the first, second, third and fourth plurality of antenna elements radiate a plurality of radio frequency (RF) beams in response to the first, second, third and fourth transmit signals.

* * * * *